United States Patent
Nagata et al.

(10) Patent No.: US 11,482,962 B2
(45) Date of Patent: Oct. 25, 2022

(54) ON-VEHICLE MOTOR-DRIVEN COMPRESSOR

(71) Applicant: KABUSHIKI KAISHA TOYOTA JIDOSHOKKI, Kariya (JP)

(72) Inventors: Yoshiki Nagata, Kariya (JP); Hiroshi Fukasaku, Kariya (JP); Takashi Kawashima, Kariya (JP); Shunsuke Ambo, Kariya (JP); Junya Kaida, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 140 days.

(21) Appl. No.: 17/028,557

(22) Filed: Sep. 22, 2020

(65) Prior Publication Data
US 2021/0091699 A1 Mar. 25, 2021

(30) Foreign Application Priority Data
Sep. 25, 2019 (JP) .............................. JP2019-174302

(51) Int. Cl.
| H02P 27/06 | (2006.01) |
| H02M 1/44 | (2007.01) |
| H01F 27/32 | (2006.01) |
| F04D 25/06 | (2006.01) |
| H01F 17/04 | (2006.01) |
| H01F 17/00 | (2006.01) |

(52) U.S. Cl.
CPC .......... *H02P 27/06* (2013.01); *F04D 25/0693* (2013.01); *H01F 17/04* (2013.01); *H01F 27/32* (2013.01); *H02M 1/44* (2013.01); *H01F 2017/0093* (2013.01)

(58) Field of Classification Search
CPC ...... H02P 27/06; F04D 25/0693; H01F 17/04; H01F 27/32; H01F 2017/0093; H02M 1/44
See application file for complete search history.

(56) References Cited

U.S. PATENT DOCUMENTS

| 9,825,560 B2 * | 11/2017 | Li .................... H02M 1/4225 |
| 2013/0002262 A1 * | 1/2013 | Tago .................... B60L 3/0069 324/503 |

(Continued)

FOREIGN PATENT DOCUMENTS

| CN | 107787544 A | 3/2018 |
| WO | 2017/170817 A1 | 10/2017 |

*Primary Examiner* — Rina I Duda
(74) *Attorney, Agent, or Firm* — Sughrue Mion, PLLC

(57) ABSTRACT

An on-vehicle motor-driven compressor includes an inverter device having a noise reducer. The noise reducer includes a common mode choke coil. The common mode choke coil includes an annular core, first and second windings wound around the core, the second winding being spaced apart from and opposed to the first winding, an annular conductor that extends over the first winding and the second winding and covers the core, and an insulating layer located between an inner circumferential surface of the conductor and outer surfaces of the first winding and the second winding. The conductor is tubular and belt-shaped. The core includes an exposed portion that is not covered by the conductor. The insulating layer is tubular and belt-shaped. An entirety of the conductor is arranged within a range between opposite ends of the insulating layer.

5 Claims, 12 Drawing Sheets

(56) References Cited

U.S. PATENT DOCUMENTS

| | | | | |
|---|---|---|---|---|
| 2015/0009725 | A1* | 1/2015 | Taguchi | H02M 5/458 |
| | | | | 363/35 |
| 2017/0012506 | A1* | 1/2017 | Naito | H02M 1/14 |
| 2017/0288512 | A1* | 10/2017 | Kagawa | H02K 11/33 |
| 2018/0194200 | A1* | 7/2018 | Ambo | F04B 35/04 |
| 2018/0198350 | A1* | 7/2018 | Ambo | H03H 7/0115 |

* cited by examiner

Fig.4A
Fig.4B
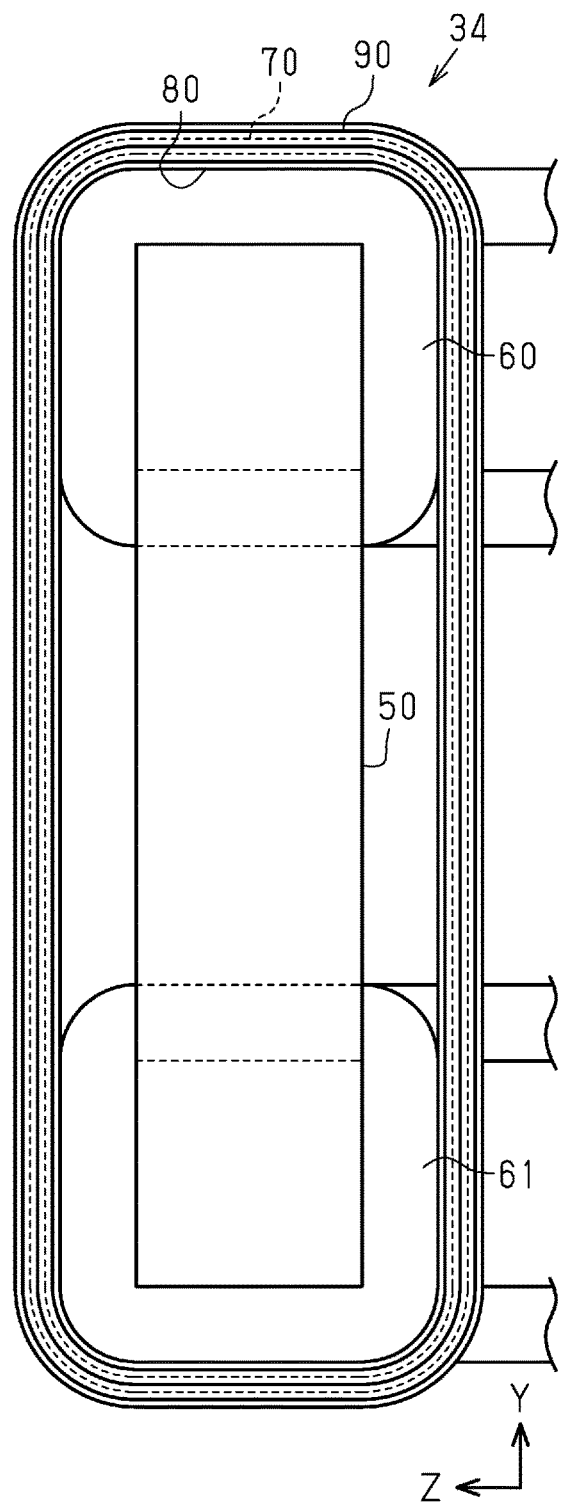
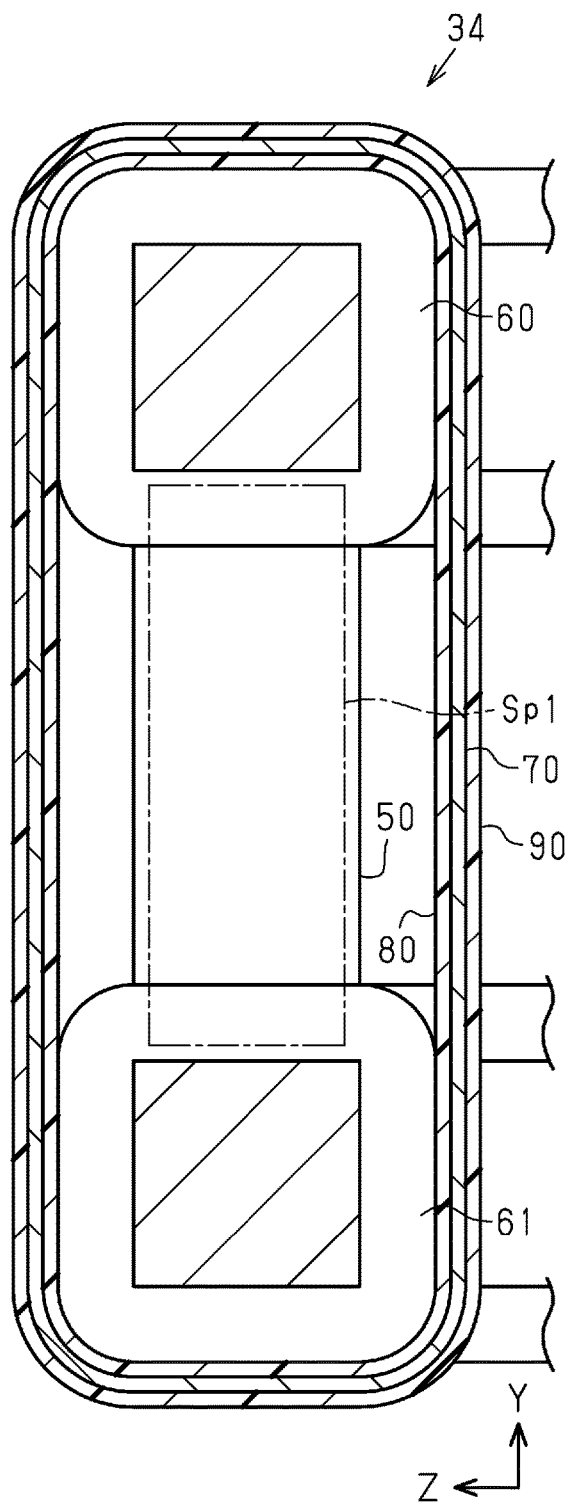

ON-VEHICLE MOTOR-DRIVEN COMPRESSOR

BACKGROUND

1. Field

The present disclosure relates to an on-vehicle motor-driven compressor.

2. Description of Related Art

International Publication WO2017/170817 discloses a common mode choke coil used in an inverter device that drives an electric motor in an on-vehicle motor-driven compressor. The covering of the common mode choke coil by a conductor causes induced current to flow into the conductor when a normal mode current flows. Thus, by converting the induced current into thermal energy, a damping effect is gained.

When the entire choke coil is covered by the conductor, heat may be likely to be trapped inside. If a portion that is not covered by the conductor is provided in order to enhance the heat radiation performance, induced current may not flow readily. This may reduce the damping effect.

It is an object of the present disclosure to provide an on-vehicle motor-driven compressor including a filter circuit that is excellent in heat radiation performance and damping effect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An on-vehicle motor-driven compressor that achieves the above-described object includes a compression unit configured to compress fluid, an electric motor configured to drive the compression unit, and an inverter device configured to drive the electric motor. The inverter device includes an inverter circuit configured to convert direct-current power into alternating-current power and a noise reducer provided on an input side of the inverter circuit, the noise reducer being configured to reduce a common mode noise and a normal mode noise that are included in the direct-current power prior to being input to the inverter circuit. The noise reducer includes a common mode choke coil and a smoothing capacitor that configures a low pass filter circuit together with the common mode choke coil. The common mode choke coil includes an annular core, a first winding wound around the core, a second winding wound around the core, the second winding being spaced apart from and opposed to the first winding, an annular conductor that extends over the first winding and the second winding and covers the core, and an insulating layer located between an inner circumferential surface of the conductor and outer surfaces of the first winding and the second winding. The conductor is tubular and belt-shaped. The core includes an exposed portion that is not covered by the conductor. The insulating layer is tubular and belt-shaped. An entirety of the conductor is arranged within a range between opposite ends of the insulating layer.

Other aspects and advantages of the present invention will become apparent from the following description, taken in conjunction with the accompanying drawings, illustrating by way of example the principles of the invention.

BRIEF DESCRIPTION OF THE DRAWINGS

FIG. 4A is a right side view of the common mode choke coil shown in FIG. 3A (as viewed in the direction indicated by arrow B in FIG. 3A).

FIG. 4B is a cross-sectional view taken along line 4B-4B show in FIG. 3A.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment will now be described with reference to the drawings. An on-vehicle motor-driven compressor 11 according to the present embodiment includes a compression unit 18, which compresses refrigerant serving as fluid, and is used in an on-vehicle air conditioner 10. That is, the fluid to be compressed in the on-vehicle motor-driven compressor 11 in the present embodiment is refrigerant.

Figure 1:
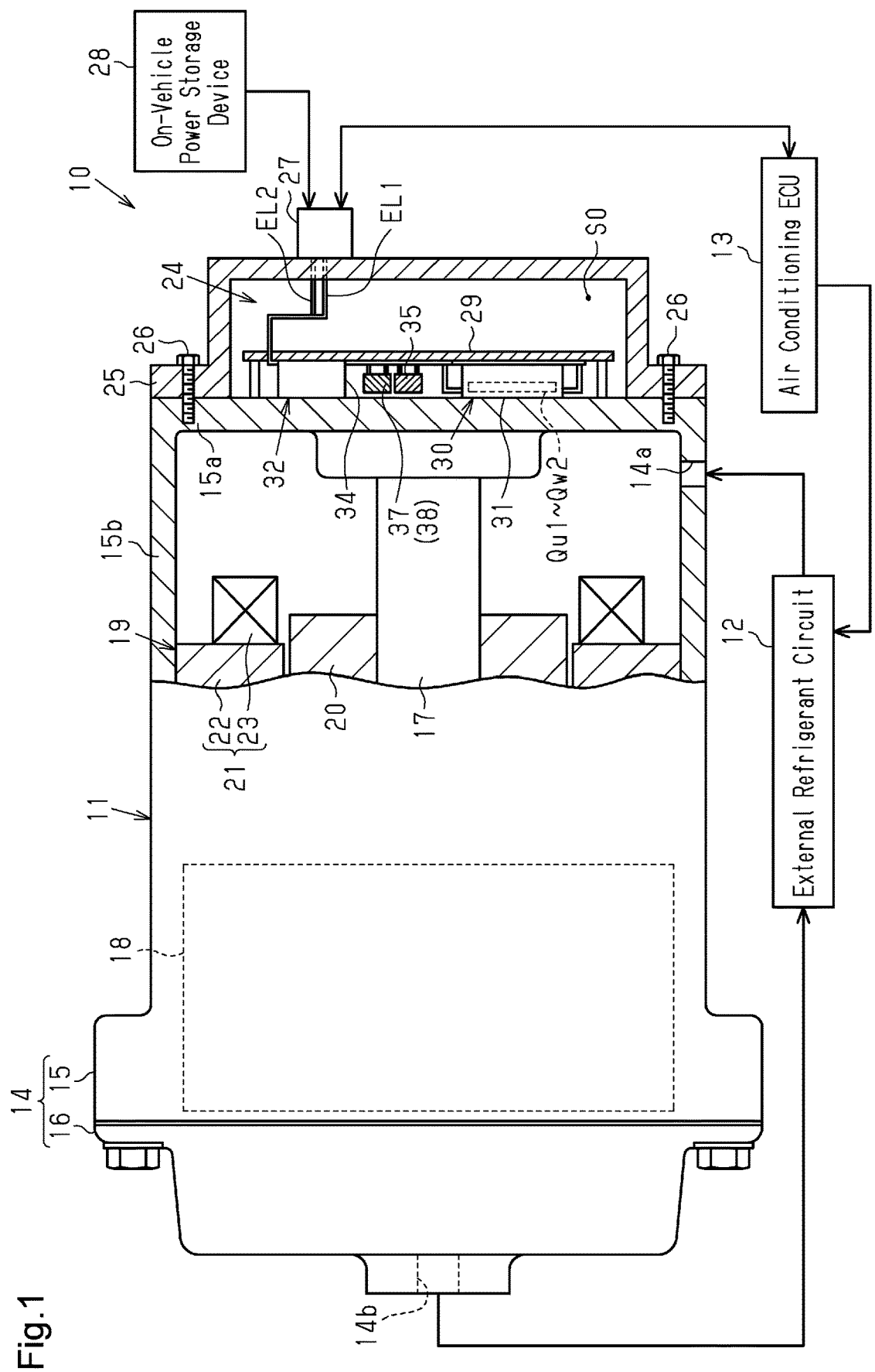
FIG. 1 is a diagram showing the general structure of an on-vehicle motor-driven compressor.

As shown in FIG. 1, the on-vehicle air conditioner 10 includes the on-vehicle motor-driven compressor 11 and an external refrigerant circuit 12, which supplies refrigerant serving as fluid to the on-vehicle motor-driven compressor 11. The external refrigerant circuit 12 includes, for example, a heat exchanger and an expansion valve. The on-vehicle motor-driven compressor 11 compresses the refrigerant, and the external refrigerant circuit 12 performs heat exchange of the refrigerant and expands the refrigerant. This allows the on-vehicle air conditioner 10 to cool and warm the passenger compartment.

The on-vehicle air conditioner 10 includes an air conditioning ECU 13, which controls the entire on-vehicle air conditioner 10. The air conditioning ECU 13 is capable of obtaining parameters such as the temperature of the passenger compartment and a setting temperature of an automobile air conditioning system. Using these parameters, the air conditioning ECU 13 outputs various commands such as an ON-OFF command to the on-vehicle motor-driven compressor 11.

The on-vehicle motor-driven compressor 11 includes a housing 14, which includes a suction port 14a through which refrigerant is drawn in from the external refrigerant circuit 12.

The housing 14 is made of a thermally conductive material (for example, metal such as aluminum). The housing 14 is grounded to the body of the vehicle.

The housing 14 includes a suction housing member 15 and a discharge housing member 16, which are coupled to each other. The suction housing member 15 is tubular and includes an opening at one end and a bottom at the other end. The suction housing member 15 includes a plate-shaped bottom wall 15a and a side wall 15b, which extends upright from the periphery of the bottom wall 15a toward the discharge housing member 16. The bottom wall 15a has, for example, a substantially plate-shaped, and the side wall 15b is, for example, substantially tubular. The discharge housing member 16 is coupled to the suction housing member 15 with the opening of the suction housing member 15 closed. Thus, an internal space is defined in the housing 14.

The suction port 14a is provided in the side wall 15b of the suction housing member 15. More specifically, the suction port 14a is located at a position of the side wall 15b of the suction housing member 15 that is closer to the bottom wall 15a than to the discharge housing member 16.

The housing 14 includes a discharge port 14b, through which refrigerant is discharged. The discharge port 14b is provided in the discharge housing member 16, more specifically, in a part of the discharge housing member 16 that is opposed to the bottom wall 15a.

The on-vehicle motor-driven compressor 11 includes a rotary shaft 17, the compression unit 18, and an electric motor 19, which are accommodated in the housing 14.

The rotary shaft 17 is rotationally supported by the housing 14. The rotary shaft 17 is arranged with its axial direction coinciding with the thickness direction of the plate-shaped bottom wall 15a (in other words, the axial direction of the tubular side wall 15b). The rotary shaft 17 and the compression unit 18 are coupled to each other.

The compression unit 18 is located in the housing 14 at a position closer to the discharge port 14b than to the suction port 14a (in other words, than to the bottom wall 15a). The compression unit 18 is configured to compress the refrigerant that has been drawn into the housing 14 out of the suction port 14a and discharge the compressed refrigerant out of the discharge port 14b when the rotary shaft 17 rotates. The compression unit 18 may be of any type such as a scroll type, a piston type, or a vane type.

The electric motor 19 is located in the housing 14 between the compression unit 18 and the bottom wall 15a. The electric motor 19 is configured to drive the compression unit 18 by rotating the rotary shaft 17 in the housing 14. The electric motor 19 includes, for example, a cylindrical rotor 20, which is fixed to the rotary shaft 17, and a stator 21, which is fixed to the housing 14. The stator 21 includes a cylindrical stator core 22 and coils 23, which are wound around the teeth of the stator core 22. The rotor 20 and the stator 21 are opposed to each other in the radial direction of the rotary shaft 17. When the coils 23 are energized, the rotor 20 and the rotary shaft 17 rotate. This causes the compression unit 18 to compress refrigerant.

As shown in FIG. 1, the on-vehicle motor-driven compressor 11 includes a driving device 24, which is configured to drive the electric motor 19 and receive direct-current power, and a cover member 25, which defines an accommodation chamber S0. The accommodation chamber S0 accommodates the driving device 24.

The cover member 25 is made of a non-magnetic, thermally conductive material (for example, metal such as aluminum).

The cover member 25 is tubular and includes a bottom that opens toward the housing 14, more specifically, toward the bottom wall 15a of the suction housing member 15. The cover member 25 is coupled to the bottom wall 15a of the housing 14 by bolts 26 with the opening end of the cover member 25 abutting against the bottom wall 15a. The opening of the cover member 25 is closed by the bottom wall 15a. The accommodation chamber S0 is defined by the cover member 25 and the bottom wall 15a.

The accommodation chamber S0 is arranged outside the housing 14 and is located on the opposite side of the bottom wall 15a from the electric motor 19. The compression unit 18, the electric motor 19, and the driving device 24 are laid out in the axial direction of the rotary shaft 17.

The cover member 25 includes a connector 27, which is electrically connected to the driving device 24. Direct-current power is input to the driving device 24 from an on-vehicle electric storage device 28, which is mounted on the vehicle, by the connector 27, and the air conditioning ECU 13 and the driving device 24 are electrically connected to each other by the connector 27. The on-vehicle electric storage device 28 is a direct-current power supply mounted on the vehicle, which is, for example, a rechargeable battery or a capacitor.

As shown in FIG. 1, the driving device 24 includes a circuit board 29, an inverter device 30, which is provided on the circuit board 29, and two connection lines EL1, EL2, which are used to electrically connect the connector 27 and the inverter device 30 to each other.

The circuit board 29 has the shape of a plate. The circuit board 29 is opposed to the bottom wall 15a at a predetermined distance in the axial direction of the rotary shaft 17.

The inverter device 30 is configured to drive the electric motor 19. The inverter device 30 includes an inverter circuit 31 (see FIG. 2) and a noise reducer 32 (see FIG. 2). The inverter circuit 31 is configured to convert direct-current power into alternating-current power. The noise reducer 32 is provided on the input side of the inverter circuit 31 and is configured to reduce a common mode noise and a normal mode noise that are included in the direct-current power prior to being input to the inverter circuit 31.

The electrical configurations of the electric motor 19 and the driving device 24 will now be described.

Figure 2:
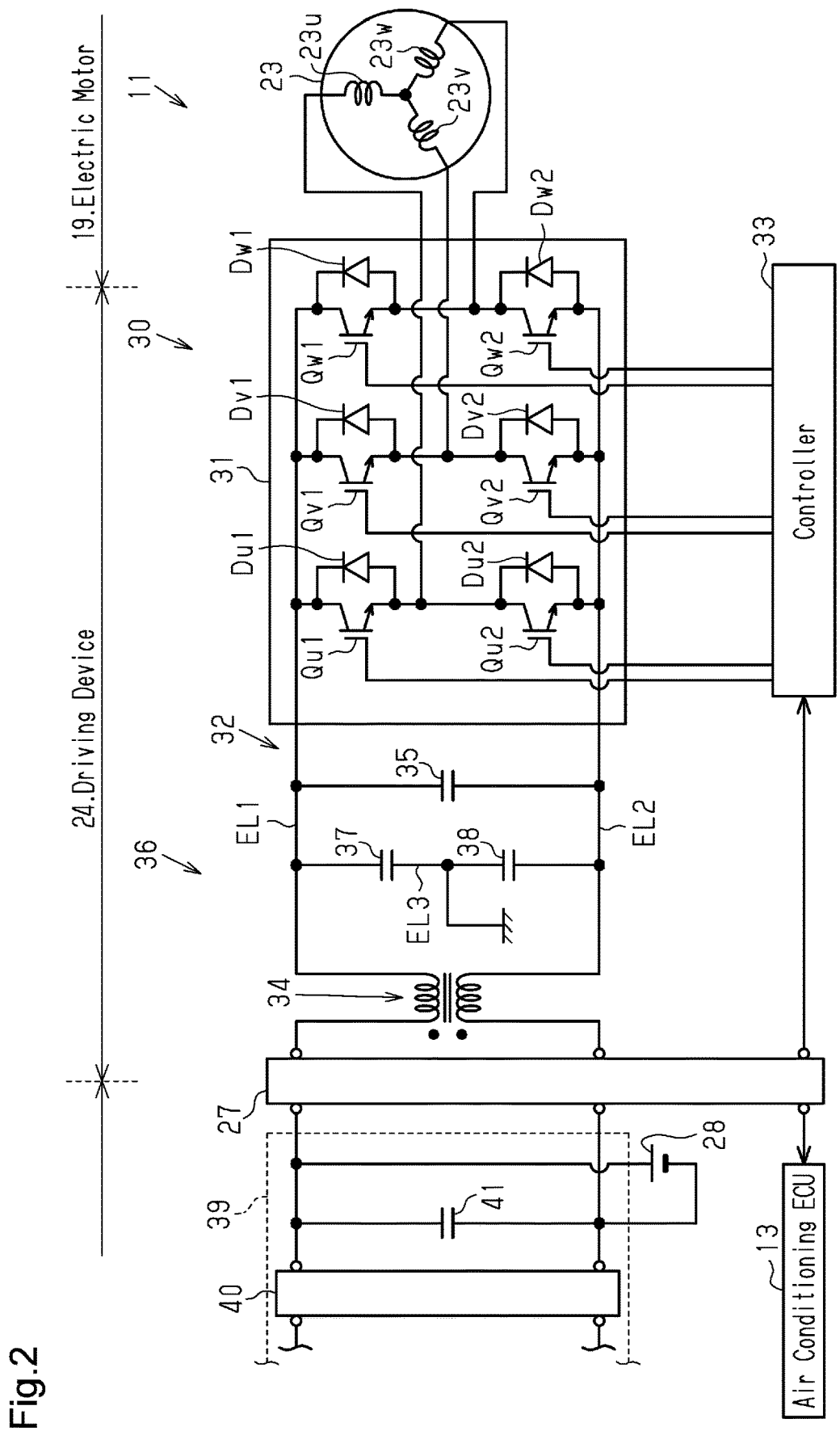
FIG. 2 is a circuit diagram of the driving device and the electric motor.

As shown in FIG. 2, the coils 23 of the electric motor 19 are of a three-phase structure, for example, with a u-phase coil 23u, a v-phase coil 23v, and a w-phase coil 23w. The coils 23u to 23w are connected, for example, in a Y-connection.

The inverter circuit 31 includes u-phase switching elements Qu1, Qu2 corresponding to the u-phase coil 23u, v-phase switching elements Qv1, Qv2 corresponding to the v-phase coil 23v, and w-phase switching elements Qw1, Qw2 corresponding to the w-phase coil 23w. Each of the switching elements Qu1 to Qw2 is, for example, a power switching element such as an IGBT. The switching elements Qu1 to Qw2 include freewheeling diodes (body diodes) Du1 to Dw2.

The u-phase switching elements Qu1, Qu2 are connected in series to each other by a connection wire that is connected to the u-phase coil 23u. The serially-connected body of the u-phase switching elements Qu1, Qu2 is electrically connected to the connection lines EL1, EL2. The serially-connected body receives direct-current power from the on-vehicle electric storage device 28.

Except for the corresponding coil, the other switching elements Qv1, Qv2, Qw1, Qw2 are connected in the same manner as the u-phase power switching elements Qu1, Qu2.

The driving device 24 includes a controller 33, which is configured to control switching operations for the switching elements Qu1 to Qw2. The controller 33 is realized, for example, by at least one dedicated hardware circuit and/or at least one processor (control circuitry) that operates in accordance with a computer program (software). The processor includes a CPU and memories such as a RAM and a ROM. The memories store, for example, program codes or commands configured to cause the processor to execute various processes. The memory, or computer readable medium, includes any type of medium that is accessible by general-purpose computers and dedicated computers.

The controller 33 is electrically connected to the air conditioning ECU 13 by the connector 27. Using commands from the air conditioning ECU 13, the controller 33 periodically turns the switching elements Qu1 to Qw2 on and off. In detail, the controller 33 uses commands from the air conditioning ECU 13 to execute pulse width modulation control (PWM control) for the switching elements Qu1 to Qw2. More specifically, the controller 33 uses a carrier signal and a commanded voltage value signal (signal for comparison) to generate control signals. The controller 33 uses the generated control signals to execute ON-OFF control for the switching elements Qu1 to Qw2, thereby converting direct-current power into alternating-current power.

The noise reducer 32 includes a common mode choke coil 34 and an X capacitor 35. The X capacitor 35, which serves as a smoothing capacitor, and configures a low pass filter circuit 36 together with the common mode choke coil 34. The low pass filter circuit 36 is provided on the connection lines EL1, EL2. The low pass filter circuit 36 is provided between the connector 27 and the inverter circuit 31 in terms of circuitry.

The common mode choke coil 34 is provided on the two connection lines EL1, EL2.

The X capacitor 35 is provided on the output stage of the common mode choke coil 34 and is electrically connected to the two connection lines EL1, EL2. That is, the X capacitor 35 is provided between the common mode choke coil 34 and the inverter circuit 31. The X capacitor 35 and a normal mode inductance generated by leakage magnetic fluxes from the common mode choke coil 34 configure an LC resonance circuit. That is, the low pass filter circuit 36 of the present embodiment is an LC resonance circuit including the common mode choke coil 34.

Two Y capacitors 37, 38 (first Y capacitor 37 and second Y capacitor 38) are connected in series to each other. More specifically, the driving device 24 includes a bypass line EL3, which connects one end (i.e., first end) of the first Y capacitor 37 and one end (i.e., first end) of the second Y capacitor 38 to each other. The bypass line EL3 is grounded to the body of the vehicle.

The serially-connected body of the two Y capacitors 37, 38 is provided between the common mode choke coil 34 and the X capacitor 35, and is electrically connected to the common mode choke coil 34. The other end (i.e., second end) of the first Y capacitor 37 on the side opposite to the first end of the first Y capacitor 37 is connected to the first connection line EL1, more specifically, to a section of the first connection line EL1 that connects a first winding 60 (described later) of the common mode choke coil 34 and the inverter circuit 31 to each other. The other end (i.e., second end) of the second Y capacitor 38 on the side opposite to the first end of the second Y capacitor 38 is connected to the second connection line EL2, more specifically, to a section of the second connection line EL2 that connects a second winding 61 (described later) of the common mode choke coil 34 and the inverter circuit 31 to each other.

The on-vehicle devices of the vehicle include, for example, a power control unit (PCU) 39, which is provided separately from the driving device 24. The PCU 39 uses the direct-current power supplied from the on-vehicle electric storage device 28 to drive electrical components such as a traveling motor mounted in the vehicle. That is, in the present embodiment, the PCU 39 and the driving device 24 are connected in parallel to the on-vehicle electric storage device 28, and the on-vehicle electric storage device 28 is shared by the PCU 39 and the driving device 24.

The PCU 39 includes, for example, a boost converter 40 and a power supply capacitor 41. The boost converter 40 includes a boost switching element and periodically turns the boost switching element on and off to boost the direct-current power of the on-vehicle electric storage device 28. The power supply capacitor 41 is connected in parallel to the on-vehicle electric storage device 28. The PCU 39 includes a traveling inverter (not shown) that converts the direct-current power boosted by the boost converter 40 into drive power capable of driving the traveling motor.

In such a configuration, the noise generated through the switching of the boost switching element flows into the driving device 24 as a normal mode noise. In other words, the normal mode noise contains a noise component corresponding to the switching frequency of the boost switching element.

The configuration of the common mode choke coil 34 will now be described with reference to FIGS. 3A, 3B, 4A, 4B, 5A, 5B, 6A, 6B, 7A, and 7B.

The common mode choke coil 34 is configured to limit situations in which a high-frequency noise generated in the PCU 39 of the vehicle is transmitted to the inverter circuit 31 of the compressor. The common mode choke coil 34 is used as, in particular, the L component in the low pass filter circuit (LC filter) 36, which eliminates the normal mode noise (differential mode noise) by utilizing a leakage inductance as a normal inductance. That is, it is possible to cope with the common mode noise and the normal mode noise (differential mode noise), and instead of using the common mode choke coil and the normal mode (differential mode) choke coil respectively, one choke coil is used to cope with both mode noises.

In the drawings, a three-axis orthogonal coordinate system is defined such that the axial direction of the rotary shaft 17 in FIG. 1 is defined as the Z-direction and the directions orthogonal to the Z-direction are defined as the X-direction and Y-direction.

As shown in FIGS. 3A, 3B, 4A, and 4B, the common mode choke coil 34 includes an annular core 50, the first winding 60, the second winding 61, a metal thin film 70, which serves as an annular conductor, and a plastic layer 80, which serves as an insulating layer, and a plastic layer 90.

Figure 7A:
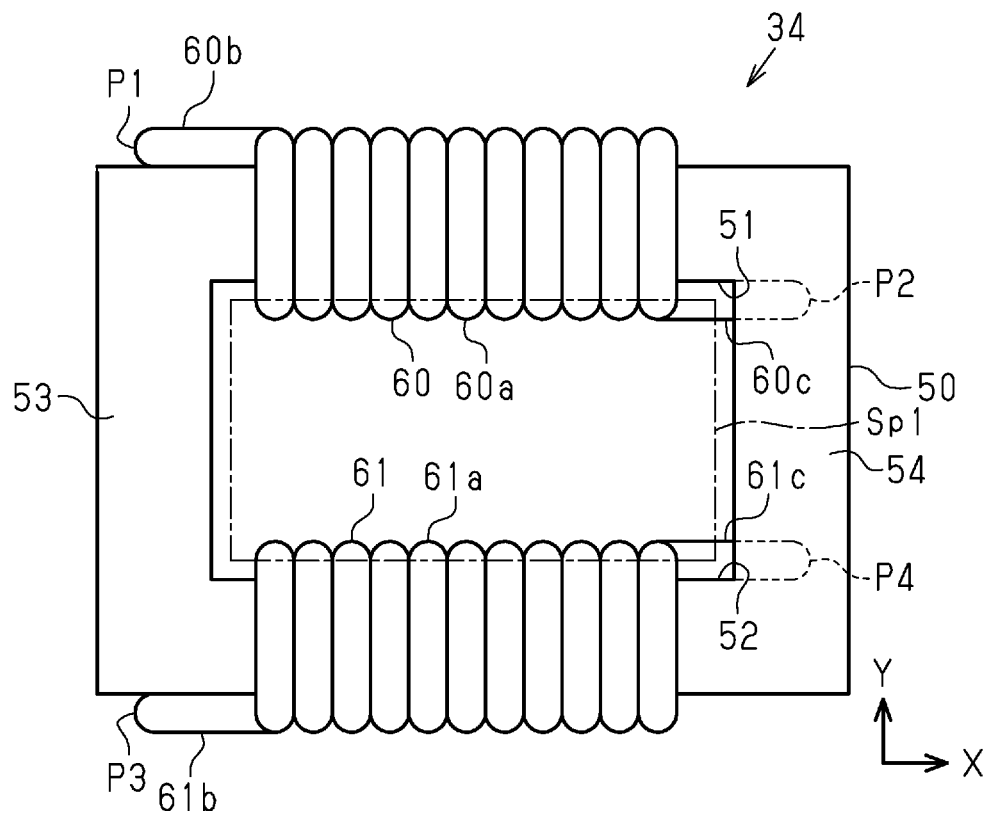
FIG. 7A is a plan view of the core and the windings.

The core 50 has a quadrilateral cross section, and the entire core 50 has a rectangular shape in the X-Y plane shown in FIG. 7A. As shown in FIGS. 4B and 7A, the core 50 includes an inner space Sp1.

Figure 7B:
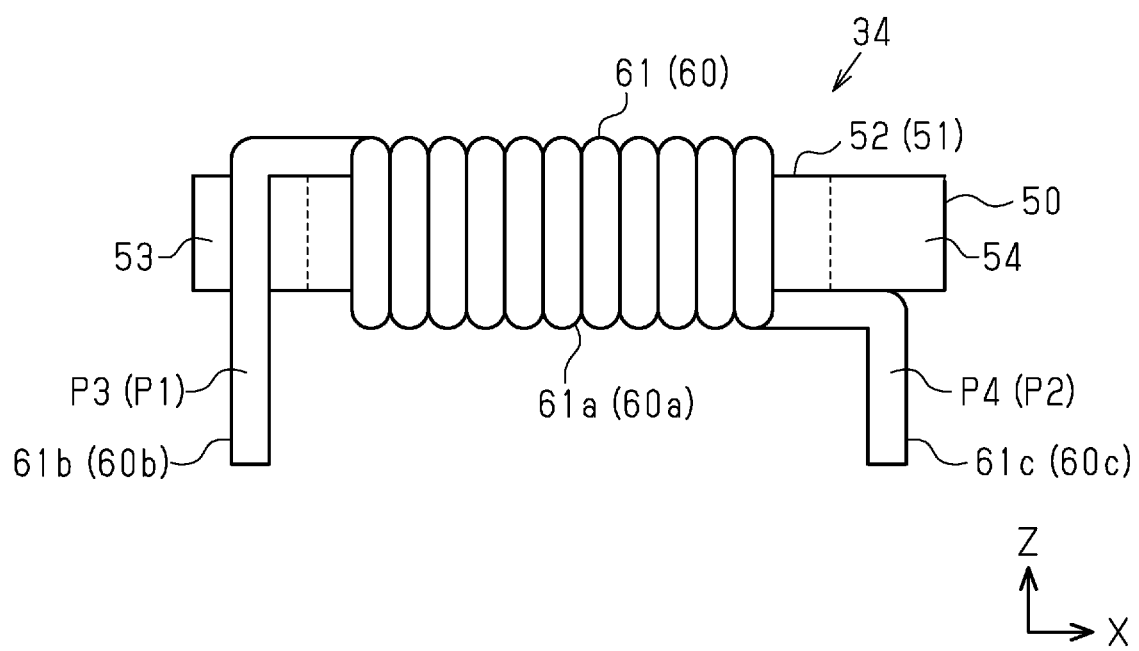
FIG. 7B is a front view of the core and the windings.

As shown in FIGS. 7A and 7B, the first winding 60 is wound around the core 50, and the second winding 61 is wound around the core 50. More specifically, as shown in FIG. 7A, one long side portion of the rectangular core 50 is a first linear portion 51, the other long side portion is a second linear portion 52, and the first linear portion 51 and the second linear portion 52 are parallel to each other. That is, the core 50 includes the first linear portion 51 and the second linear portion 52, which extend linearly so as to be parallel to each other. At least a part of the first winding 60 is wound around the first linear portion 51, and at least a part of the second winding 61 is wound around the second linear portion 52. The winding directions of the two windings 60, 61 are opposite to each other. Further, the first winding 60 and the second winding 61 are spaced apart from and opposed to each other.

A plastic case (not shown) is provided between the core 50 and the windings 60, 61. A protrusion (not shown) extends from the plastic case to abut against the metal thin film 70 so that the metal thin film 70 is prevented from moving.

Referring to FIGS. 3A, 3B, 4A, and 4B, the metal thin film 70 is made of copper foil. That is, the metal thin film 70, which serves as an annular conductor, has the shape of a thin film. The thickness of the metal thin film 70 is 10 μm to 100 μm. For example, the thickness of the metal thin film 70 is 35 μm. The reason for thinning the metal thin film 70 is to increase the resistance when current (induced current) flows and to convert the electrical energy into heat. However, when the metal thin film 70 is thinned, maintaining its strength and shape is difficult.

As shown in FIGS. 4A and 4B, the metal thin film 70 is annular, more specifically, is tubular and belt-shaped. The metal thin film 70 extends over the first winding 60 and the second winding 61 and covers the core 50. More specifically, the metal thin film 70 is provided so as to cover the entire first winding 60, the entire second winding 61, and a part of the inner space Sp1 of the core 50 (see FIGS. 4B and 7A). In a broad sense, the metal thin film 70 is provided so as to cover at least a part of each of the first winding 60, the second winding 61, and the inner space Sp1 of the core 50 (see FIGS. 4B and 7A). The inner space Sp1 is also located between the first winding 60 and the second winding 61, and the metal thin film 70 includes sections that are located between the first winding 60 and the second winding 61 opposed to each other with the inner space Sp1 in between.

The plastic layer 80, which serves as an insulating layer, is located between the inner circumferential surface of the metal thin film 70 and the outer surfaces of the first winding 60 and the second winding 61.

Referring to FIGS. 4A and 4B, the plastic layer 80 maintains the strength of the metal thin film 70, improves the rigidity of the metal thin film 70, and ensures the insulation performance. The plastic layer 80 is made of polyimide, and maintains the strength and the shape of the metal thin film 70, which is thin. The thickness of the plastic layer 80 is, for example, several tens of μm. This is because it is desired that the windings 60, 61 and the metal thin film 70 be as proximate to each other as possible and induced current flows when the metal thin film 70 receives the magnetic fields produced by the windings 60, 61. The induced current readily flows when the metal thin film 70 is proximate to the windings 60 and 61.

Figure 3A:
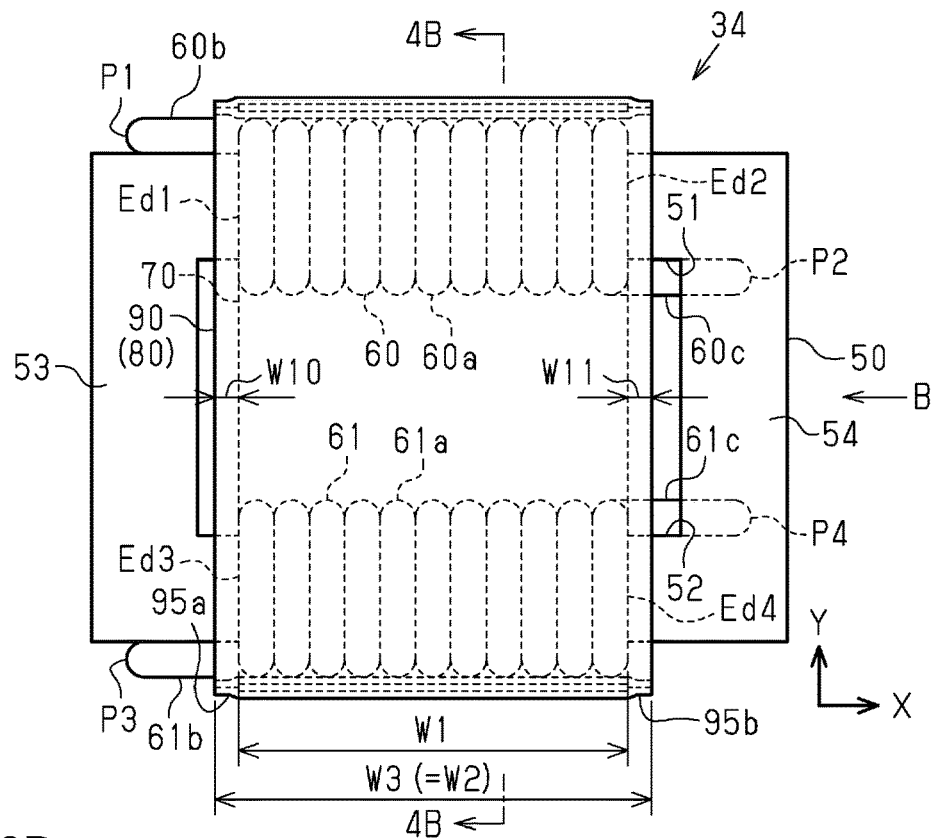
FIG. 3A is a plan view of the common mode choke coil.

As shown in FIG. 3A, one short side portion and the other short side portion of the quadrangular core 50 are exposed portions 53, 54, which are not covered by the metal thin film 70.

Figure 5A:
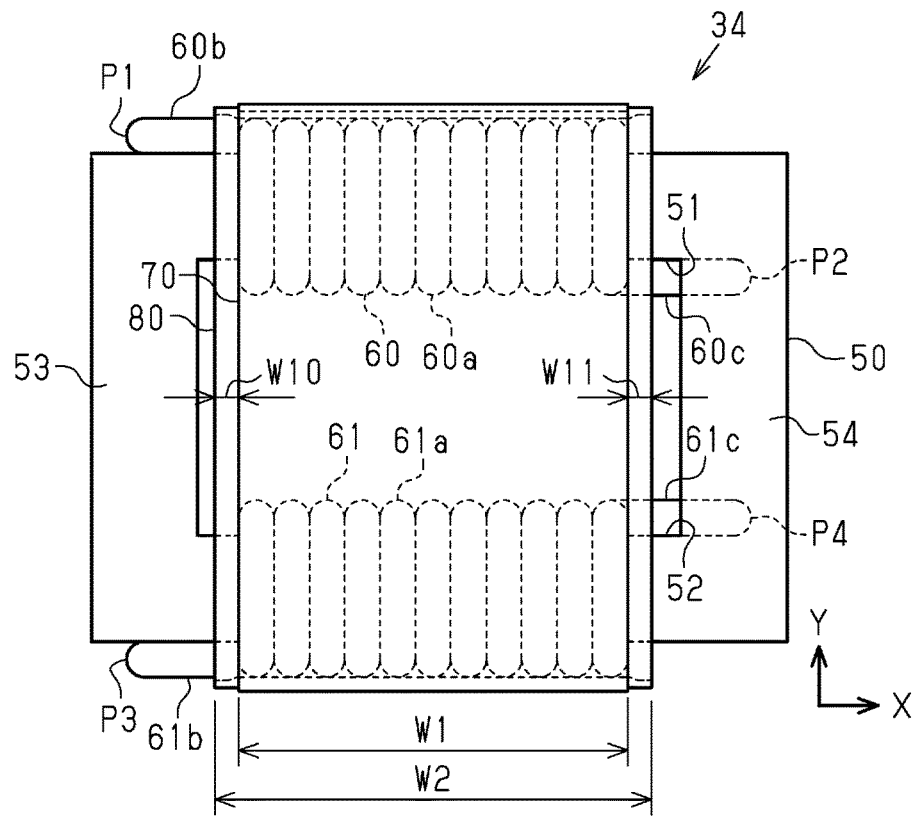
FIG. 5A is a plan view of the core, the windings, the metal thin film, and the plastic layer that is located on the inner circumferential side of the metal thin film.
Figure 5B:
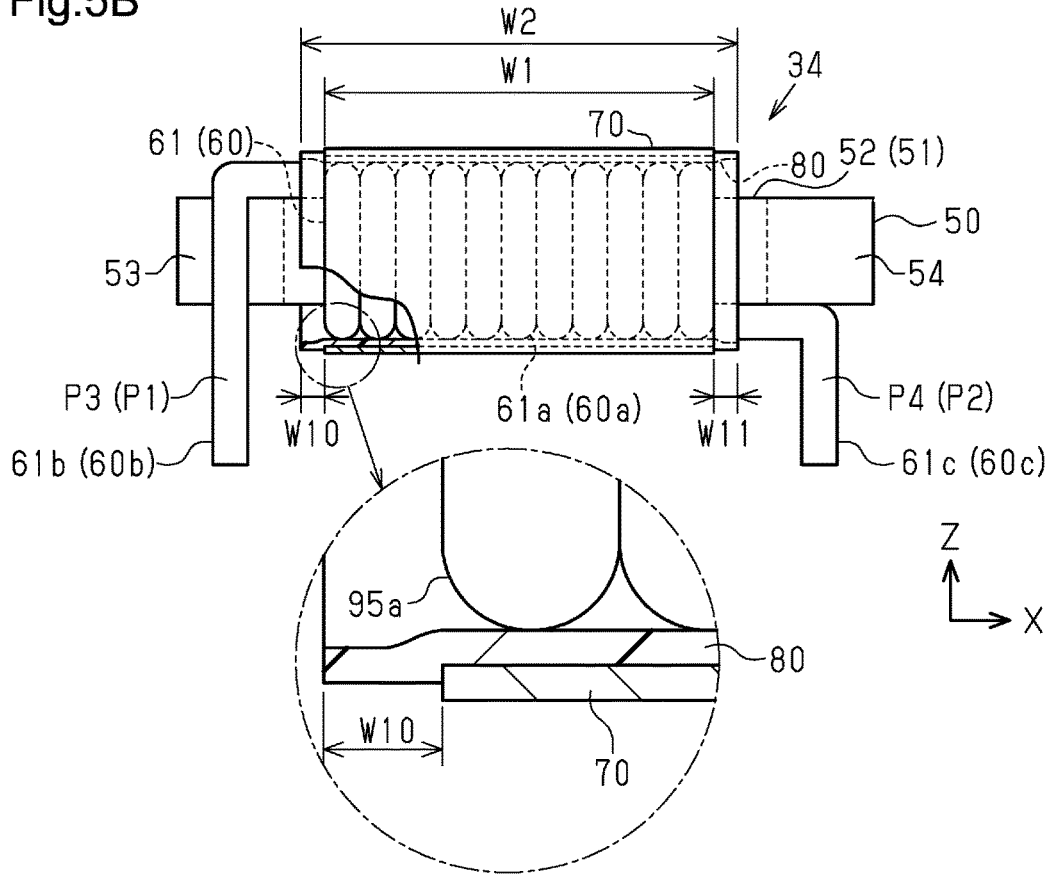
FIG. 5B is a front view of the core, the windings, the metal thin film, and the plastic layer that is located on the inner circumferential side of the metal thin film.
Figure 6A:
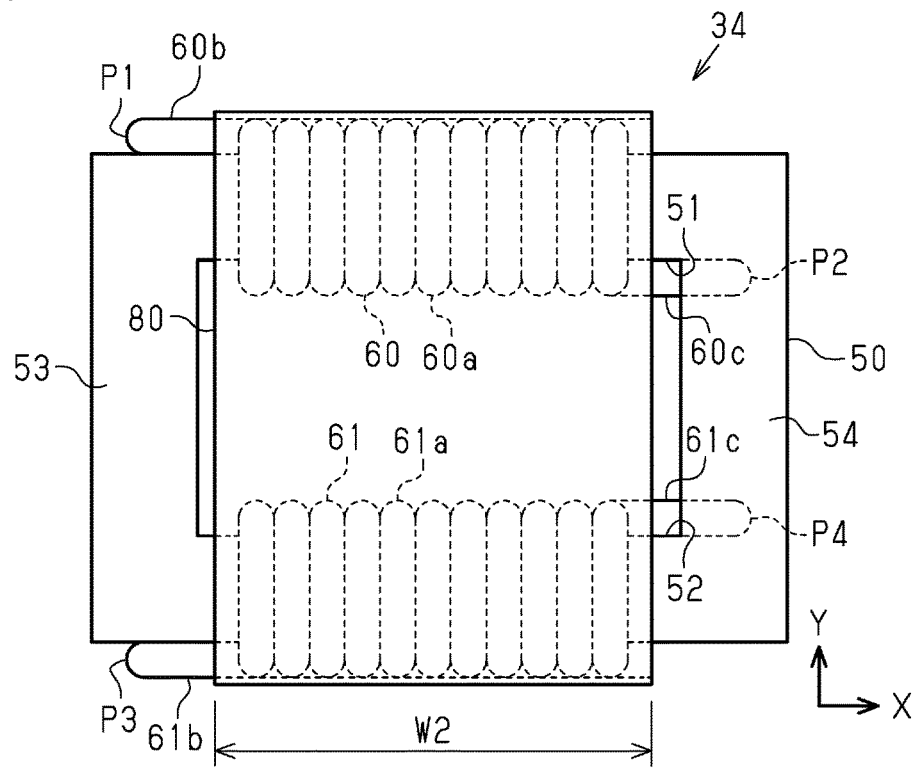
FIG. 6A is a plan view of the core, the windings, and the plastic layer that is located on the inner circumferential side.
Figure 6B:
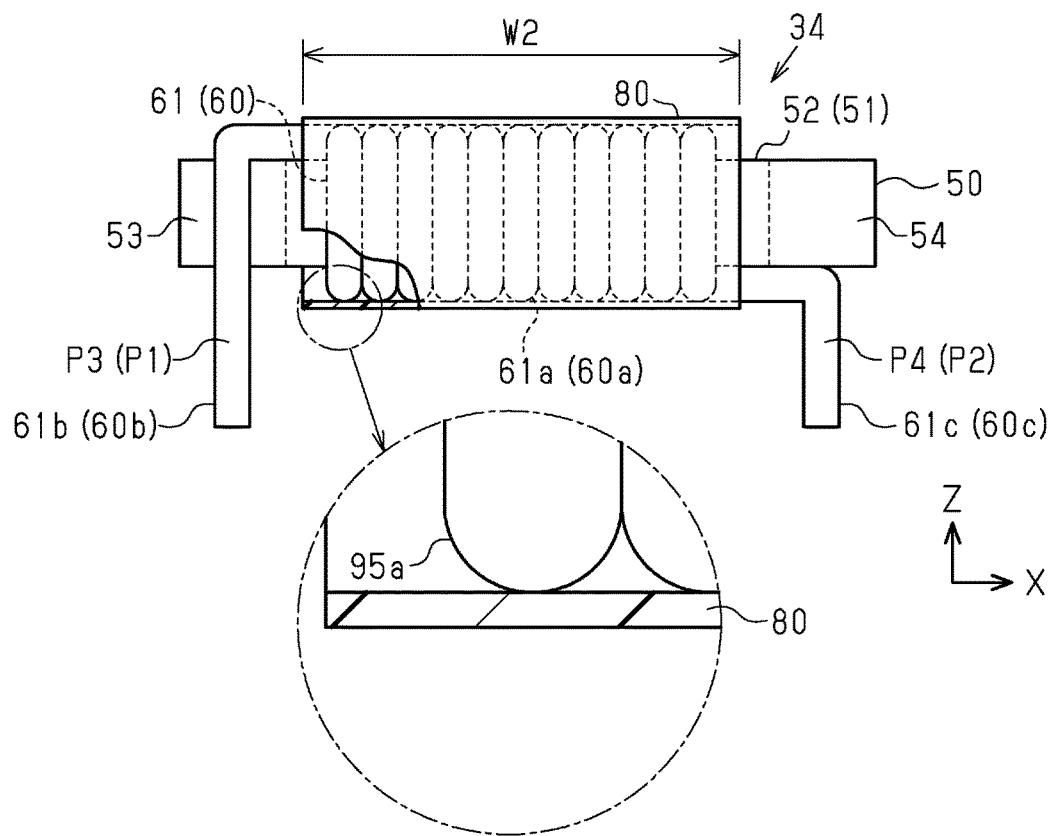
FIG. 6B is a front view of the core, the windings, and the plastic layer that is located on the inner circumferential side.

FIGS. 5A and 5B show a state in which the plastic layer 90 is not provided. FIGS. 6A and 6B show a state in which the plastic layer 90 and the metal thin film 70 are not provided.

As shown in FIGS. 5A, 5B, 6A, and 6B, the entire metal thin film 70 is arranged within the range between the opposite ends of the plastic layer 80. That is, the plastic layer 80 is tubular and belt-shaped, the length (width W2) of the plastic layer 80 in the extension direction (X-direction) of the core 50 is longer (wider) than the length (width W1) of the metal thin film 70, and the opposite ends of the plastic layer 80 in the extension direction (X-direction) of the core 50 extend out of the metal thin film 70. In the extension direction (X-direction) of the core 50, the length (width W1) of the metal thin film 70 is equal to (i.e., is the same as) the lengths (widths) of winding portions 60a, 61a of the windings 60, 61.

As shown in FIGS. 3A, 3B, 4A, and 4B, the plastic layer 90 covers at least a part of the outer surface of the metal thin film 70. That is, while the plastic layer 90 may be provided on the entire surface of the metal thin film 70, a part of the plastic layer 90 may also be provided with an opening. When the plastic layer 90 includes the opening, the plastic layer 90 is excellent in the heat radiation performance. The plastic layer 90 is made of polyimide. More specifically, the metal thin film 70 is bonded to one surface of the plastic layer 80, and the plastic layer 90 is bonded to that surface of the plastic layer 80 with the metal thin film 70 in between. The three-layer structure is arranged around the windings 60, 61.

Figure 3B:
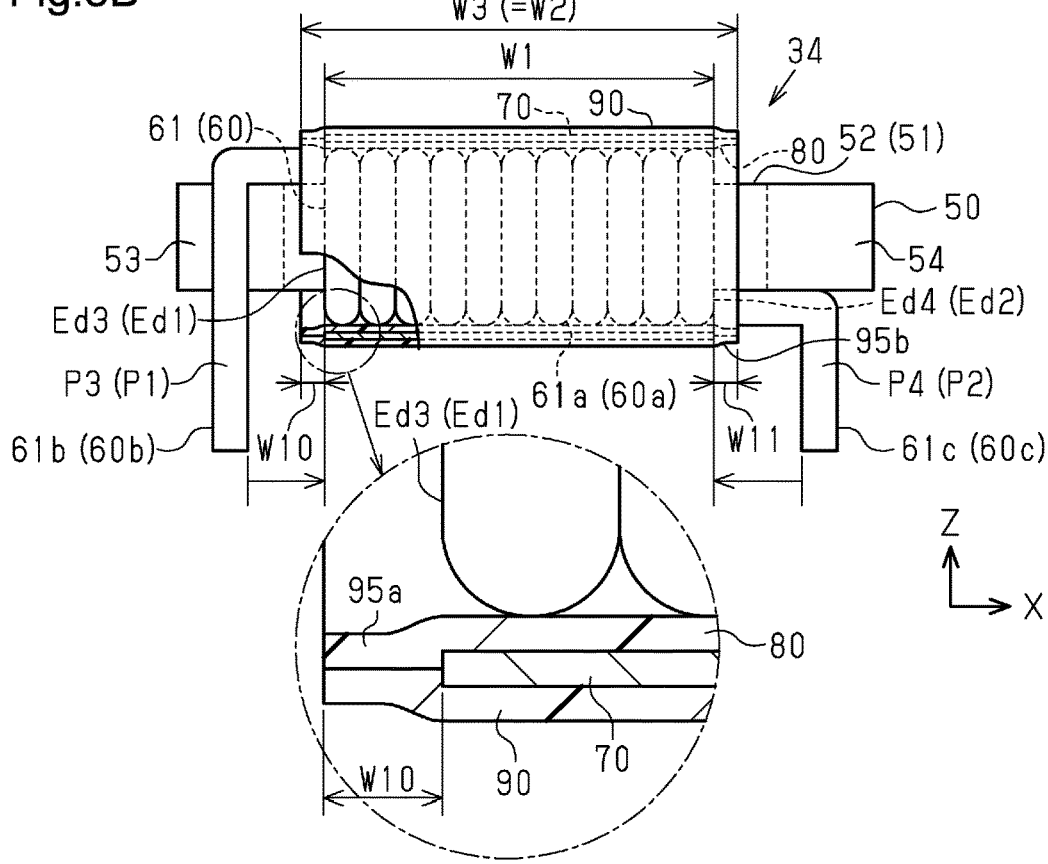
FIG. 3B is a front view of the common mode choke coil.

As shown in FIGS. 3A and 3B, the plastic layer 90 is tubular and belt-shaped, and the entire metal thin film 70 is arranged within the range between the opposite ends of the plastic layer 90. That is, the length (width W3) of the plastic layer 90 in the extension direction (X-direction) of the core 50 is longer (wider) than the length (width W1) of the metal thin film 70, and the opposite ends of the plastic layer 90 in the extension direction (X-direction) of the core 50 extend out of the metal thin film 70. In the extension direction (X-direction) of the core 50, the length (width W2, see FIGS. 5A and 5B) of the plastic layer 80 is equal to (i.e., is the same as) the length (width W3, see FIGS. 3A and 3B) of the plastic layer 90.

As shown in FIGS. 7A and 7B, the first winding 60 includes a winding portion 60a and first and second leads 60b, 60c, which extend from opposite ends of the winding portion 60a. The first and second leads 60b, 60c are paired. The distal ends of the first and second leads 60b, 60c extend in the direction (Z-direction) that intersects the extension direction (X-direction) of the core 50. The second winding 61 includes a winding portion 61a and first and second leads 61b, 61c, which extend from opposite ends of the winding portion 61a. The first and second leads 61b, 61c are paired. The distal ends of the first and second leads 61b, 61c extend in the direction (Z-direction) that intersects the extension direction (X-direction) of the core 50. As shown in FIGS. 3A, 3B, 5A, and 5B, the metal thin film 70 is located so as to cover the winding portions 60a, 61a. The metal thin film 70 and the winding portions 60a, 61a are located in the extension direction (X-direction) of the core 50 between the distal ends of the first and second leads 60b, 60c and the distal ends of the first and second leads 61b, 61c.

As shown in FIGS. 3A, 3B, 4A, and 4B, the metal thin film 70, which is tubular and belt-shaped, is located between the plastic layer 80 and the plastic layer 90. In the plastic layers 80, 90, the lengths (widths W2, W3) of the plastic layers 80, 90 are longer (wider) than the length (width W1) of the metal thin film 70 in the extension direction (X-direction) of the core 50. Further, the opposite ends of the plastic layers 80, 90 include first and second insulating portions 95a, 95b, which are provided by bonding the plastic layers 80, 90 to each other. The first and second insulating portions 95a, 95b are paired.

As shown in FIGS. 3A and 3B, the winding portion 60a includes a first end Ed1, which is located in the extension direction (X-direction) of the core 50. The first end Ed1 is positioned toward the second lead 60c from a portion P1 of the first lead 60b, which extends in the direction (Z-direction) that intersects the extension direction (X-direction) of the core 50, by an amount corresponding to a width W10 of the first insulating portion 95a or more. Further, the winding portion 60a includes a second end Ed2, which is located in the extension direction (X-direction) of the core 50. The second end Ed2 is positioned toward the first lead 60b from a portion P2 of the second lead 60c, which extends in the direction (Z-direction) that intersects the extension direction (X-direction) of the core 50, by an amount corresponding to a width W11 of the second insulating portion 95b or more.

In the same manner, the winding portion 61a includes a first end Ed3, which is located in the extension direction (X-direction) of the core 50. The first end Ed3 is positioned toward the second lead 61c from a portion P3 of the first lead 60b, which extends in the direction (Z-direction) that intersects the extension direction (X-direction) of the core 50, by the amount corresponding to the width W10 of the first insulating portion 95a or more. Further, the winding portion 61a includes a second end Ed4, which is located in the extension direction (X-direction) of the core 50. The second end Ed4 is positioned toward the first lead 61b from a portion P4 of the first lead 60b, which extends in the direction (Z-direction) that intersects the extension direction (X-direction) of the core 50, by the amount corresponding to the width W11 of the second insulating portion 95b or more.

The operation will now be described.

First, the normal mode (differential mode) will be described with reference to FIGS. 8 and 9.

Figure 8:
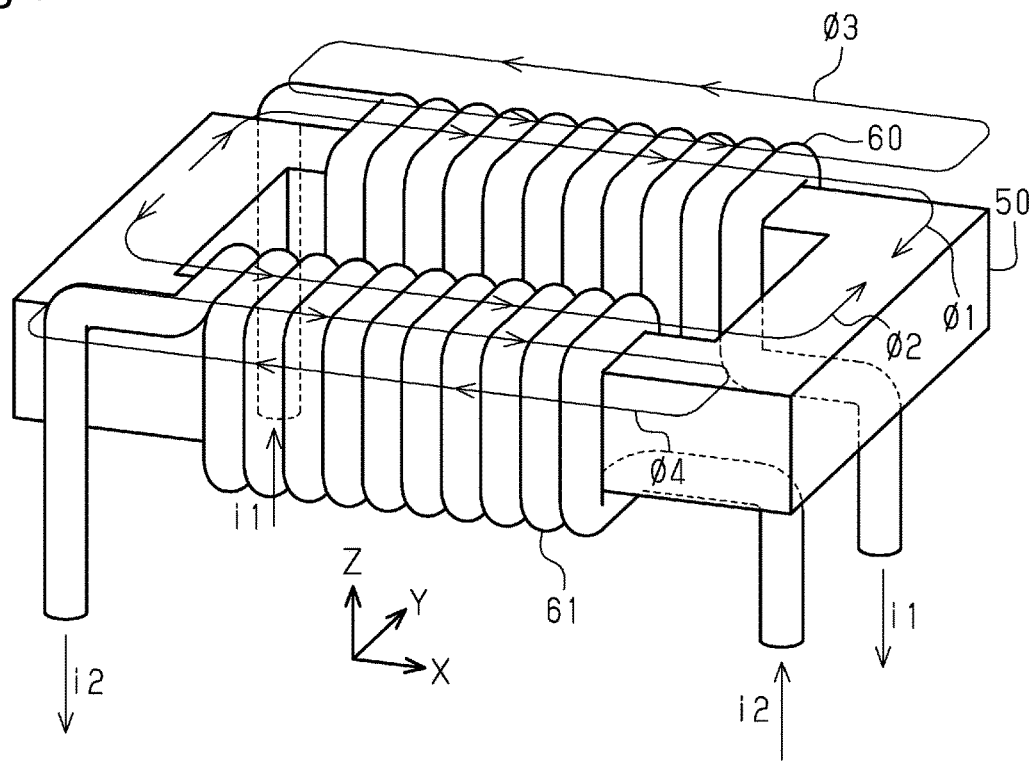
FIG. 8 is a perspective view of the core and the windings, illustrating the operation of the embodiment.
Figure 9:
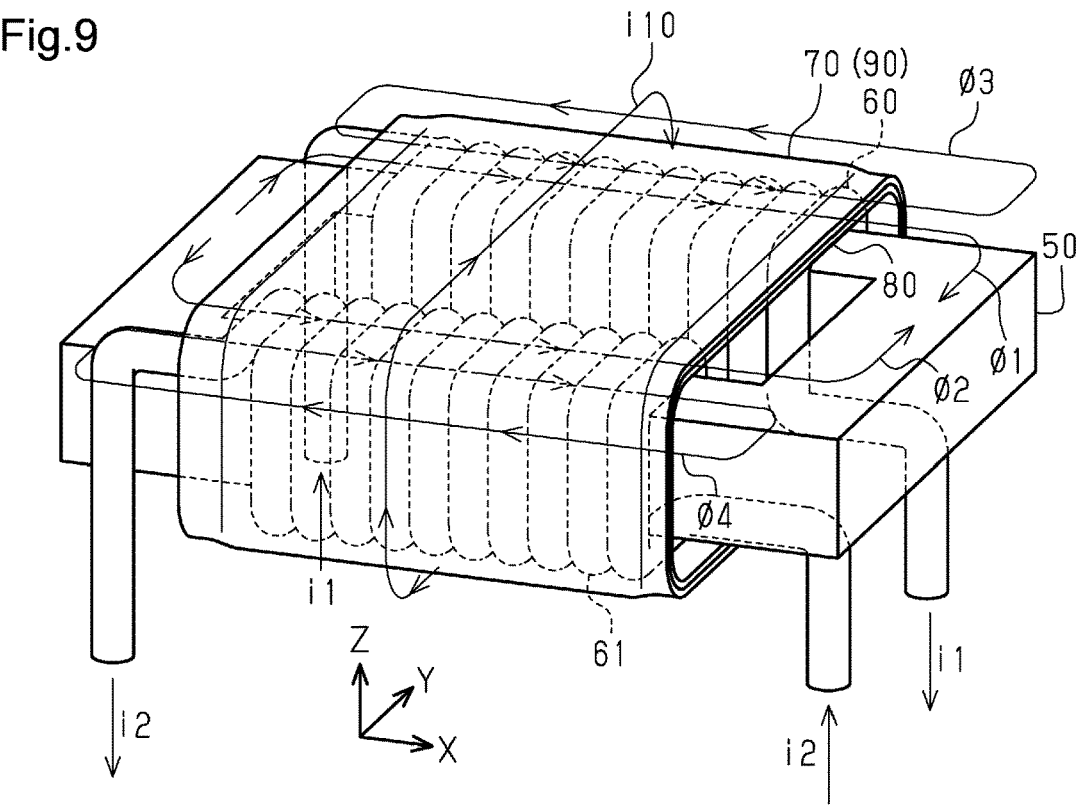
FIG. 9 is a perspective view of the common mode choke coil, illustrating the operation of the embodiment.

As shown in FIG. 8, when the first winding 60 and the second winding 61 are energized, currents i1, i2 flow. This generates magnetic fluxes φ1, φ2 in the core 50 and leakage magnetic fluxes φ3, φ4. The magnetic fluxes φ1, φ2 are mutually opposite magnetic fluxes, and the leakage magnetic fluxes φ3, φ4 are generated. As shown in FIG. 9, an induced current i10 flows in the circumferential direction inside the metal thin film 70 so as to generate magnetic fluxes in a direction resisting the generated leakage magnetic fluxes φ3, φ4.

In this manner, the induced current (eddy current) i10 flows in the circumferential direction inside the metal thin film 70 so as to generate magnetic fluxes in a direction resisting the leakage magnetic fluxes that are generated through the energization of the first winding 60 and the second winding 61. The induced current flowing in the circumferential direction refers to the current flowing around the core 50.

In the common mode, the energization of the first winding 60 and the second winding 61 causes currents to flow in the same direction. This generates magnetic fluxes in the same direction in the core 50. Thus, the magnetic fluxes in the core 50 maintain the common impedance.

Figure 10:
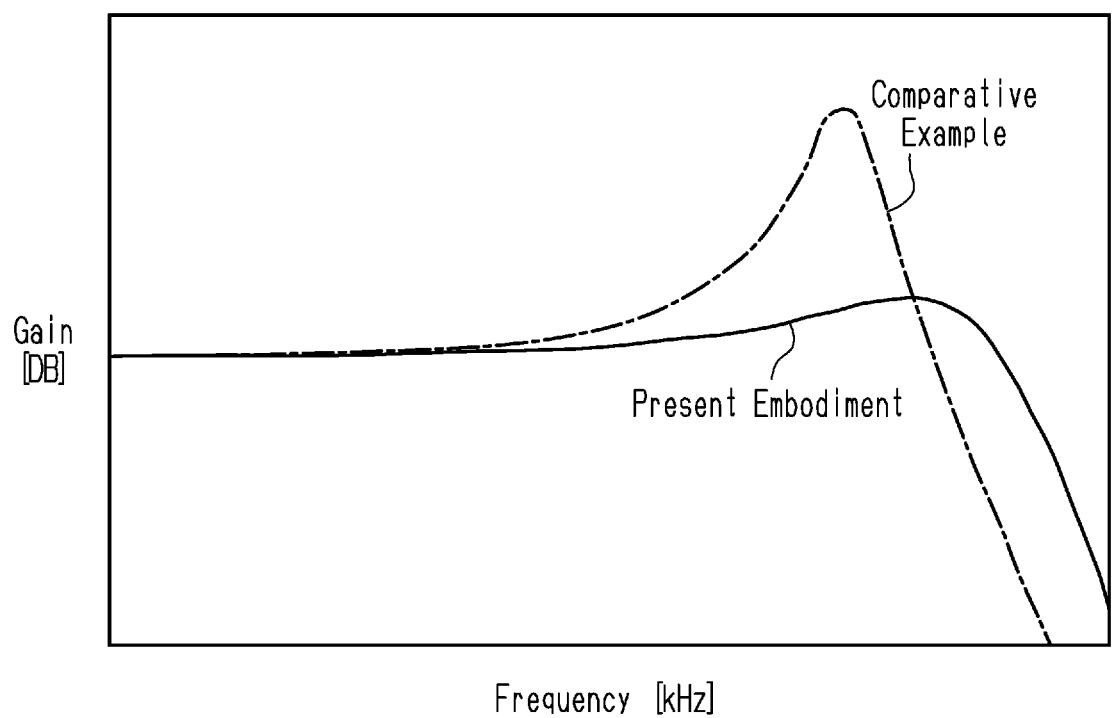
FIG. 10 is a graph showing the frequency characteristic of the gain of the low pass filter circuit.

The frequency characteristic of the low pass filter circuit 36 will now be described with reference to FIG. 10. FIG. 10 is a graph showing the frequency characteristic of the gain (attenuation amount) of the low pass filter circuit 36 in relation to the flowing-in normal mode noise. The solid line in FIG. 10 represents the case in which the common mode choke coil 34 is provided with the thin film 70 including a conductor, and the alternate long and short dashed line in FIG. 10 represents the case in which the common mode choke coil 34 is not provided with the thin film 70 including a conductor. In FIG. 10, the frequency is plotted logarithmically on the horizontal axis. Gain is a type of parameter indicating an amount by which the normal mode noise can be reduced.

As indicated by the alternate long and short dashed line in FIG. 10, when the common mode choke coil 34 does not include the thin film 70 including a conductor, the Q factor of the low pass filter circuit 36 (more specifically, the LC resonance circuit including the common mode choke coil 34 and the X capacitor 35) is relatively high. This limits a reduction in the normal mode noise of the frequency that is close to the resonance frequency of the low pass filter circuit 36.

In the present embodiment, the thin film 70 including a conductor is provided at a position where induced current is generated by the magnetic fluxes (leak magnetic fluxes φ3, φ4) that are generated in the common mode choke coil 34. The thin film 70 including a conductor is provided at a position passing through the loops of the leakage magnetic fluxes φ3, φ4 and is configured to generate induced current (eddy current) that generates magnetic fluxes in a direction in which the leakage magnetic fluxes φ3, φ4 are cancelled by the leakage magnetic fluxes φ3, φ4. As a result, the thin film 70 including a conductor functions to lower the Q factor of the low pass filter circuit 36. Thus, as indicated by the solid line in FIG. 10, the Q factor of the low pass filter circuit 36 is low. Therefore, the normal mode noise having the frequency close to the resonance frequency of the low pass filter circuit 36 is also reduced by the low pass filter circuit 36.

As described above, by employing a metal shielding structure with the metal thin film 70, which is belt-shaped and endless, in the common mode choke coil, the common mode choke coil is used in the low pass filter circuit to reduce the common mode noise. Also, by utilizing the leakage magnetic fluxes generated with respect to a normal mode current (differential mode current), an appropriate filtering performance with a reduction in the normal mode noise (differential mode noise) is obtained. That is, the use of the metal thin film 70, which is belt-shaped and endless, generates magnetic fluxes resisting the leakage magnetic fluxes that are generated during the energization with the normal mode current (differential mode current) so that electromagnetic induction causes current to flow through the metal thin film 70 and thermal energy is consumed as heat. Since the metal thin film 70 functions as a resistor, a damping effect is obtained and the resonance peak generated by the low pass filter circuit is suppressed (see FIG. 10). Further, during the energization with the common mode current, the magnetic fluxes in the core 50 maintain the common impedance. Furthermore, the arrangement of the plastic layer (polyimide layer) 80 on the inner circumferential side of the metal thin film (metal foil) 70 maintains the shape of the metal thin film 70 and ensures the insulation from the windings 60, 61.

Figure 12A:
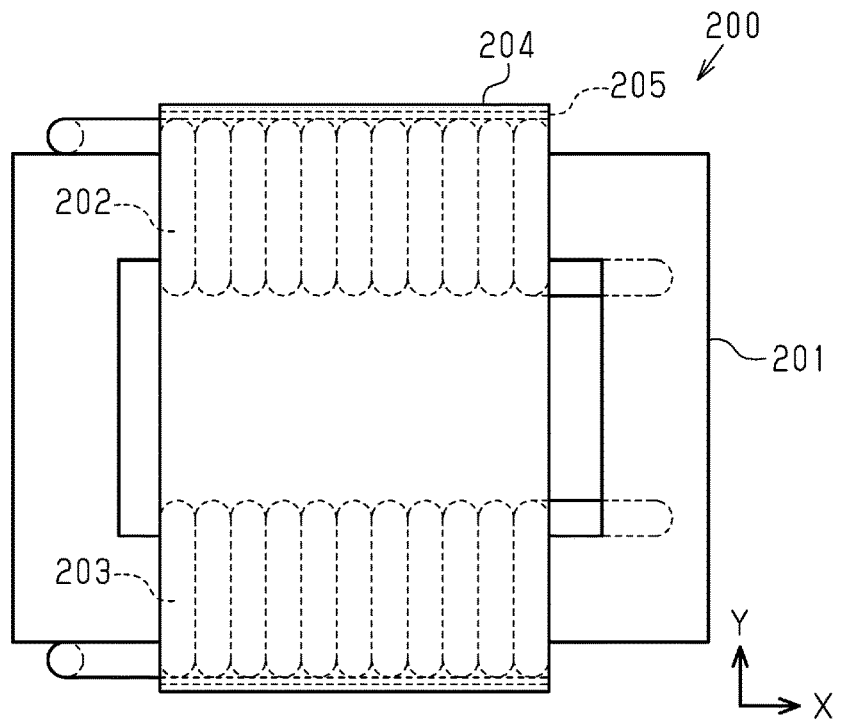
FIG. 12A is a plan view of the common mode choke coil according to a comparative example.
Figure 12B:
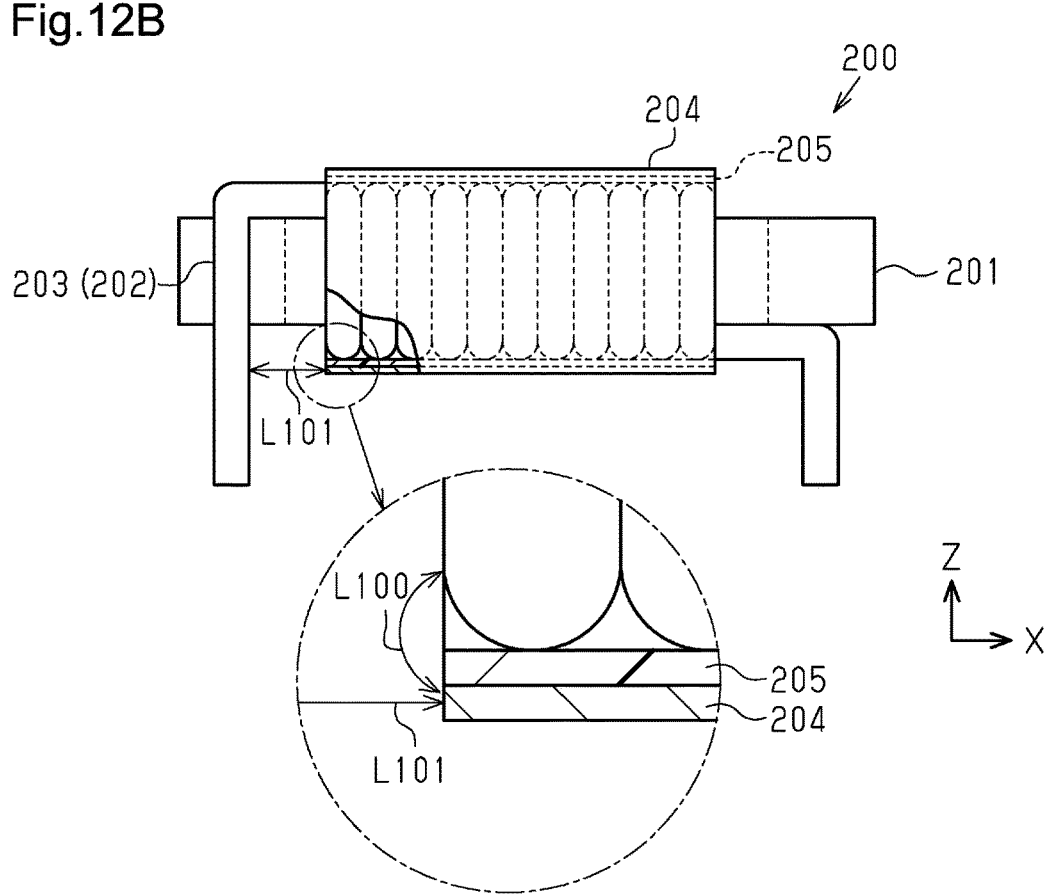
FIG. 12B is a front view of the common mode choke coil shown in FIG. 12A.

FIGS. 12A and 12B show a comparative example.

In FIGS. 12A and 12B, a common mode choke coil includes an annular core 201, a first winding 202, which is wound around the core 201, a second winding 203, which is wound around the core 201, an annular conductor 204, which extends over the first winding 202 and the second winding 203 and covers the core 201, and an insulating layer 205, which is located between the inner circumferential surface of the conductor 204 and the outer surfaces of the first winding 202 and the second winding 203. In the extension direction (X-direction) of the core 201, the width of the conductor 204 is equal to the width of the insulating layer 205. The end faces of the insulating layer 205 and the conductor 204 are aligned at their opposite ends in the extension direction (X-direction) of the core 201.

Figure 13A:
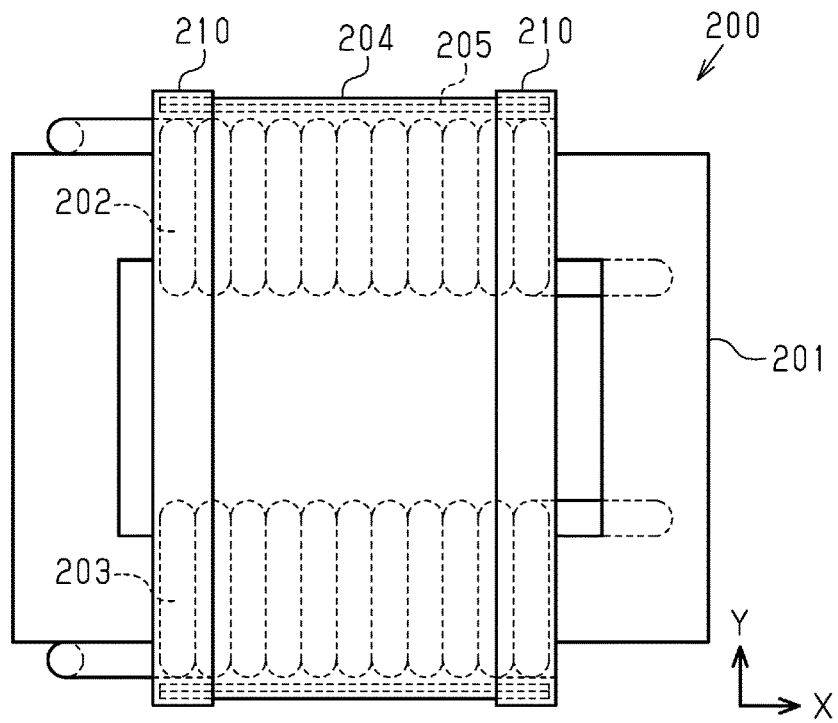
FIG. 13A is a plan view of the common mode choke coil according to another comparative example.
Figure 13B:
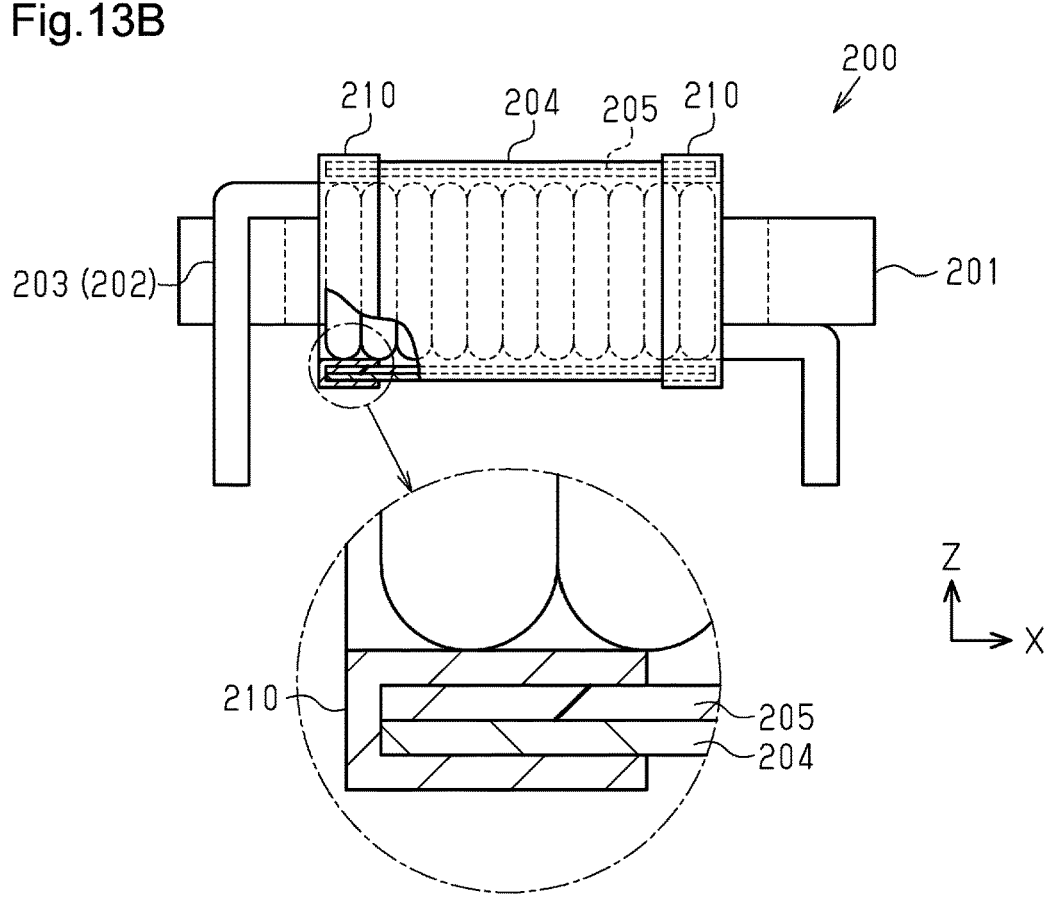
FIG. 13B is a front view of the common mode choke coil shown in FIG. 13A.

In FIGS. 12A and 12B, the insulating layer 205 is provided between the inner side of the conductor 204 and the windings 202, 203 in order to ensure the insulation of the conductor 204 and the windings 202, 203. In this case, when the width of the conductor 204 and the width of the insulating layer 205 are almost equal to or are smaller than the widths of the regions where the winding portions of the windings 202, 203 are provided, the distance (space distance) between the end faces of the conductor 204 and the windings 202, 203 is insufficient. Thus, the insulation is difficult to ensure. More specifically, as shown in FIG. 12B, the insulation at a distance L100 between the conductor 204 and the winding portions of the windings 202, 203 and the insulation at a distance L101 between the conductor 204 and the leads of the windings 202, 203 are difficult to ensure. To ensure the insulation, for example, as shown in FIGS. 13A and 13B, different insulating members 210 need to be used to cover at least the ends of the conductor 204. This causes an increase in cost.

In the present embodiment, as shown in FIGS. 3A and 3B, the width W2 of the plastic layer 80, which serves as an insulating layer, is set to be larger than the width W1 of the metal thin film 70. This ensures the insulation distance (space distance) from the windings 60, 61 and facilitates the insulation of the metal thin film 70 and the windings 60, 61. Further, the windings 60, 61 and the metal thin film 70 are in a free state. In this state, even if the windings 60, 61 and the metal thin film 70 slide in the X-direction due to vibration, the leads of the windings 60, 61 are prevented from being damaged.

In the present embodiment, the first ends Ed1, Ed3 of the winding portions 60a, 61a, which are located in the extension direction (X-direction) of the core 50, are positioned toward the first leads 60b, 61b from the portions P1, P3 of the first leads 60b, 61b, which extend in the direction (Z-direction) that intersects the extension direction (X-direction) of the core 50, by the amount corresponding to the width W10 of the first insulating portion 95a or more. In addition, the second ends Ed2, Ed4 of the winding portions 60a, 61a, which are located in the extension direction (X-direction) of the core 50, are positioned toward the second leads 60c, 61c from the portions P2, P4 of the second leads 60c, 61c, which extend in the direction (Z-direction) that intersects the extension direction (X-direction) of the core 50, by the amount corresponding to the width W11 of the second insulating portion 95b or more. Thus, even if the windings 60, 61 and the metal thin film 70 are relatively displaced in the X-direction due to vibration so that the metal thin film 70 is moved in contact with the first leads 60b, 61b or the second leads 60c, 61c, the movement of the metal thin film 70 is restricted by the insulating portions 95a, 95b. Further, even if the metal thin film 70 slides, the insulating distance is ensured. In addition, the plastic layers 80, 90 extend beyond the metal thin film 70 in the X-direction. This prevents situations in which the metal thin film 70 slides due to vibration to strike the first and second leads 60b, 60c, 61b, 61c of the windings 60, 61 and damage the windings 60, 61. Thus, deterioration in the insulation is prevented. In this manner, since the entire winding portions 60a, 61a are covered, the characteristics do not change. Furthermore, since the insulating portions 95a, 95b are provided, even if the metal thin film 70 approaches the first leads 60b, 61b or the second leads 60c, 61c, the characteristic are not changed through energization.

The above-described embodiment has the following advantages.

(1) The on-vehicle motor-driven compressor 11 includes the inverter device 30, which is configured to drive the electric motor 19. The inverter device 30 includes the inverter circuit 31 and the noise reducer 32. The noise reducer 32 includes the common mode choke coil 34 and the X capacitor 35, which serves as a smoothing capacitor that configures the low pass filter circuit 36 together with the common mode choke coil 34. The common mode choke coil 34 includes the annular core 50, the first winding 60, which is wound around the core 50, the second winding 61, which is wound around the core 50, and spaced apart from and opposed to the first winding 60, the conductor 70, which serves as an annular conductor that extends over the first winding 60 and the second winding 61 and covers the core 50, and the plastic layer 80, which serves as an insulating layer located between the inner circumferential surface of the metal thin film 70 and the outer surfaces of the first winding 60 and the second winding 61. The metal thin film 70 is tubular and belt-shaped. The core 50 includes the exposed portions 53 and 54, which are not covered by the metal thin film 70. The plastic layer 80, which serves as an insulating layer, is tubular and belt-shaped. The entire metal thin film 70 is arranged within the range between the opposite ends of the plastic layer 80.

Thus, while the heat radiation performance is excellent since the core 50 includes the exposed portions 53 and 54, which are not covered by the metal thin film 70, the metal thin film 70 has an annular shape that extends over the first winding 60 and the second winding 61 and covers the core 50. Thus, when the leakage magnetic fluxes generated during flow of the normal mode current are used to cause induced current to flow into the metal thin film 70, electrical energy is easily converted into thermal energy. Accordingly, the damping effect is excellent. The leakage magnetic fluxes generated from the first winding 60 and the second winding 61 produce a loop that passes through the exposed portions of the core 50 and is interlinked with the annular metal thin film 70. This causes induced current to flow into the metal thin film 70 readily. Also, the normal mode choke coil resulting from the generation of leakage magnetic fluxes can be omitted. Further, the plastic layer 80, which serves as an insulating layer, is located between the inner circumferential surface of the metal thin film 70 and the outer surfaces of the first winding 60 and the second winding 61. This provides a filter circuit that is excellent in the heat radiation performance and damping effect. Thus, even if the metal thin film 70 is thinned so as to increase the resistance component, the strength of the metal thin film 70 is maintained and the rigidity of the metal thin film 70 is increased. Furthermore, the plastic layer 80, which serves as an insulating layer, is tubular and belt-shaped, and the entire metal thin film 70 is arranged within the range between the opposite ends of the plastic layer 80. This ensures the insulation performance of the metal thin film 70 and the windings 60, 61.

(2) The on-vehicle motor-driven compressor 11 further includes the plastic layer 90, which covers at least a part of the outer surface of the metal thin film 70. This allows the plastic layer 90 to protect the metal thin film 70. For example, the plastic layer 90 ensures the insulation from the wires of the circuit board 29 and implemented components and prevents the contact with the implemented components.

(3) The plastic layer 90, which serves as an insulating layer, is tubular and belt-shaped, and the entire metal thin film 70 is arranged within the range between the opposite ends of the plastic layer 90. This further ensures the insulation performance of the plastic layer 90.

(4) The core 50 includes the first linear portion 51 and the second linear portion 52, which extend linearly so as to be parallel to each other. At least a part of the first winding 60 is wound around the first linear portion 51, and at least a part of the second winding 61 is wound around the second linear portion 52. Therefore, since the metal thin film 70 can be easily arranged, the core 50 is practical.

The present disclosure is not limited to the above-described embodiment, but may be modified as follows.

Instead of copper foil, the metal thin film 70 may be made of such as aluminum foil, brass foil, or stainless steel foil. These non-magnetic metals do not generate further magnetic fluxes as induced current flows therethrough and are thus easy to handle. Further, the metal thin film 70 does not have to be made of non-magnetic metal such as copper and may be made of magnetic metal such as iron.

The conductor covering the core 50 is not limited to a thin film as long as the conductor is annular. For example, the core 50 may have the shape of a relatively thick plate.

Instead of polyimide, the plastic layers 80, 90 may be made of polyester, polyethylene terephthalate (PET), or polyethylene naphthalate (PEN).

The filtering performance of the low pass filter circuit 36 can be easily adjusted (i.e., changed) by changing the width of the metal thin film 70.

In FIGS. 3A, 3B, 4A, and 4B, the plastic layer 90 may be omitted. That is, the state shown in FIGS. 5A and 5B may be employed.

In FIGS. 3A, 3B, 4A, and 4B, the plastic layer 80 may be bonded to the first winding 60 and the second winding 61.

A gap (clearance) between the plastic layer 80 and the windings 60, 61 may or may not be provided.

In FIGS. 3A and 3B, the lengths (widths) of the winding portions 60a, 61a of the windings 60, 61 and the length (width) of the metal thin film 70 in the X-direction do not have to be the same. Instead, the length (width) of the metal thin film 70 in the X-direction may be longer or shorter (wider or narrower) than the lengths (widths) of the winding portions 60a, 61a of the windings 60, 61.

Figure 11A:
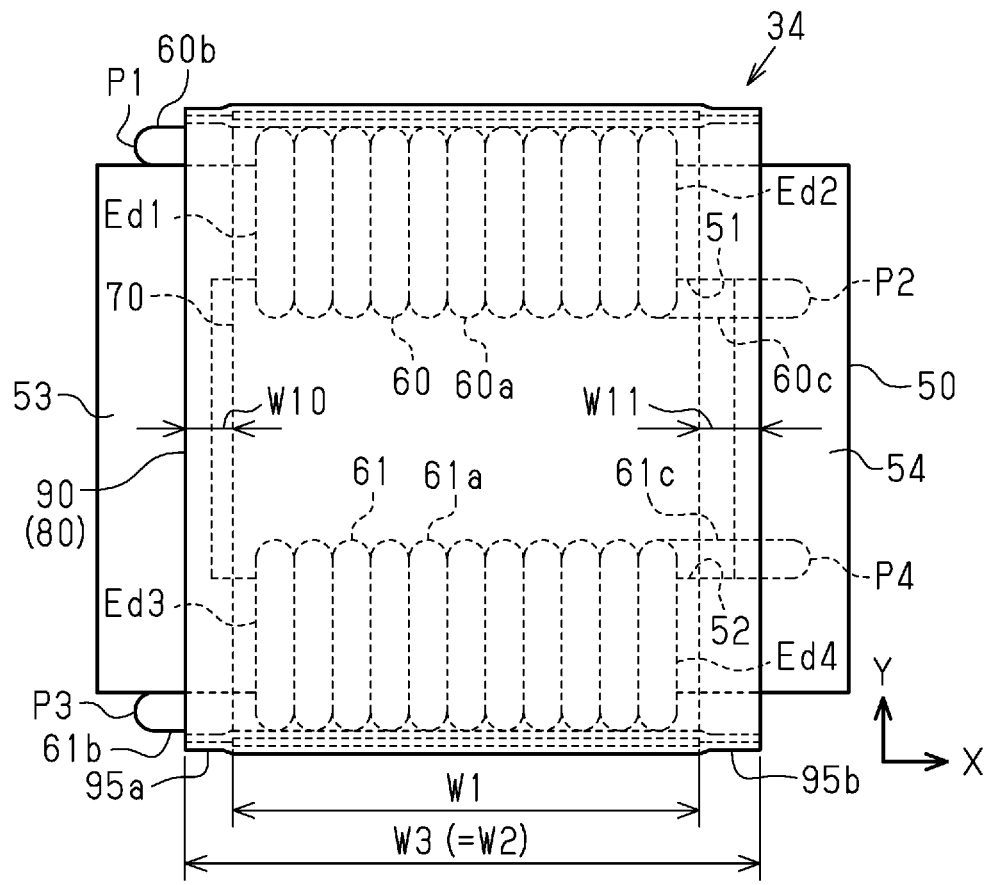
FIG. 11A is a plan view of the common mode choke coil according to a modification.
Figure 11B:
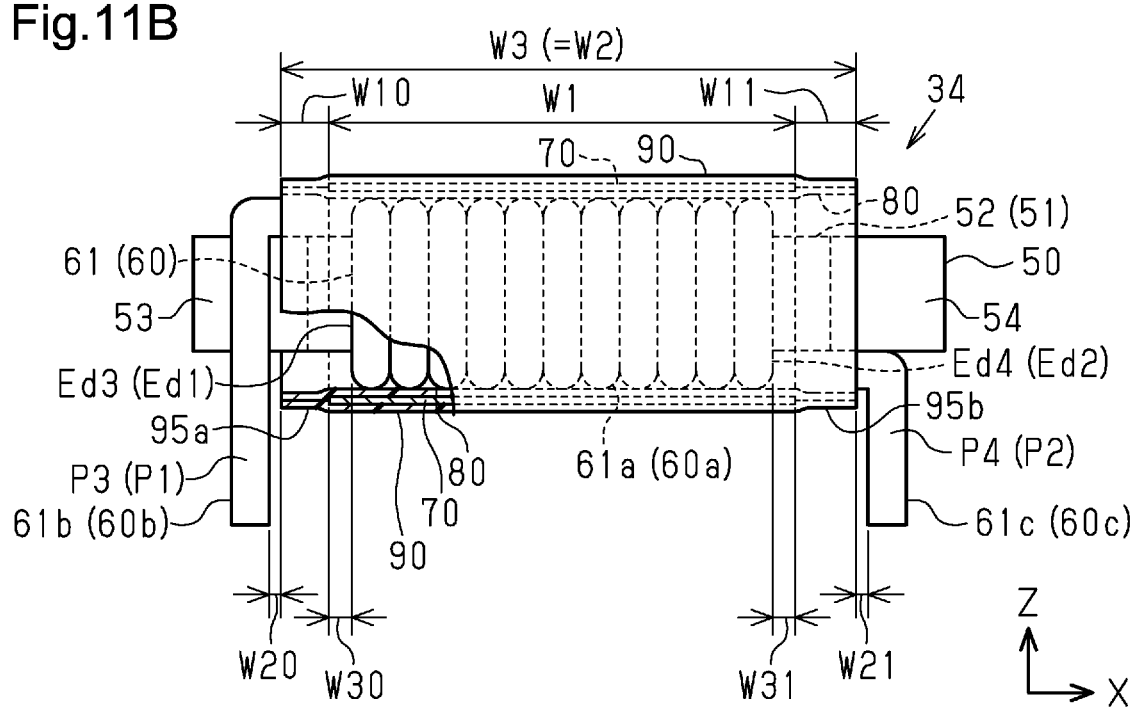
FIG. 11B is a front view of the common mode choke coil shown in FIG. 11A.

As shown in FIGS. 11A and 11B, the width W10 and the width W11 in FIGS. 3A and 3B may be long enough such that the opposite ends of the plastic layers 80, 90 are proximate to the first and second leads 61b, 61c and the movement of the thin film 70 can be restricted through the abutment with the first and second leads 61b, 61c. In FIGS. 11A and 11B, a distance (width) W20 between the insulating portion 95a and the first lead 61b in the X-direction is smaller than a distance (width) W30 between one end of the metal thin film 70 and one end of the winding portion 61a in the X-direction (W20<W30). Additionally, in FIGS. 11A and 11B, a distance (width) W21 between the insulating portion 95b and the second lead 61c in the X-direction is smaller than a distance (width) W31 between the other end of the metal thin film 70 and the other end of the winding portion 61a in the X-direction (W21<W31). In this manner, the first winding 60 and the second winding 61 may respectively include the winding portions 60a, 61a, which are wound around the core 50, and the first leads 60b, 61b and the second leads 60c, 61c, which extend from the opposite ends of the winding portions 60a, 61a and are capable of restricting the movement of the metal thin film 70 serving as a conductor. This hinders the winding portions 60a, 61a from projecting out of the opposite ends of the thin film 70 even if the motor-driven compressor vibrates. As a result, the damping effect is stable.

The term "annular" as used in this description may refer to any structure that forms a loop, or a continuous shape with no ends, as well as a generally loop-shaped structure with a gap, such as a C-shape. "Annular" shapes include but are not limited to a circular shape, an elliptic shape, and a polygonal shape with sharp or rounded corners.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An on-vehicle motor-driven compressor, comprising:
    a compression unit configured to compress fluid;
    an electric motor configured to drive the compression unit; and
    an inverter device configured to drive the electric motor, wherein
    the inverter device includes:
        an inverter circuit configured to convert direct-current power into alternating-current power; and
        a noise reducer provided on an input side of the inverter circuit, the noise reducer being configured to reduce a common mode noise and a normal mode noise that are included in the direct-current power prior to being input to the inverter circuit,
    the noise reducer includes:
        a common mode choke coil; and a smoothing capacitor that configures a low pass filter circuit together with the common mode choke coil,
the common mode choke coil includes:
an annular core;
a first winding wound around the core;
a second winding wound around the core, the second winding being spaced apart from and opposed to the first winding;
a tubular and belt-shape conductor that extends to cross over the first winding and the second winding and covers the core; and
a tubular and belt-shape insulating layer located between an inner circumferential surface of the conductor and outer surfaces of the first winding and the second winding, the insulating layer being bonded to the inner circumferential surface of the conductor,
the core includes an exposed portion that is not covered by the conductor, the exposed portion being located between a portion of the core that is wound by the first winding and a portion of the core that is wound by the second winding, and
an entirety of the conductor is arranged within a range between opposite ends of the insulating layer.

2. The on-vehicle motor-driven compressor according to claim 1, further comprising a plastic layer that covers at least a part of an outer surface of the conductor.

3. The on-vehicle motor-driven compressor according to claim 2, wherein
the plastic layer is tubular and belt-shaped, and
the entirety of the conductor is arranged within a range between opposite ends of the plastic layer.

4. The on-vehicle motor-driven compressor according to claim 1, wherein the first winding and the second winding each include
a winding portion wound around the core, and
two leads that extend from opposite ends of the winding portion and are capable of restricting movement of the conductor.

5. The on-vehicle motor-driven compressor according to claim 1, wherein
the core includes an inner space, and
the conductor covers the entire first winding, the entire second winding, and part of the inner space.

* * * * *